United States Patent
Park et al.

(10) Patent No.: US 11,039,458 B2
(45) Date of Patent: Jun. 15, 2021

(54) METHODS AND APPARATUSES FOR TRANSMISSION SCHEDULING ON MULTIPLE FREQUENCIES

(71) Applicant: QUALCOMM Incorporated, San Diego, CA (US)

(72) Inventors: Cheol Hee Park, San Diego, CA (US); Arvind Santhanam, San Diego, CA (US); Feng Lu, Santa Clara, CA (US); Taoufik Tani, San Diego, CA (US); Thomas Christol, Boulder, CO (US); Yunsong Mu, La Jolla, CA (US); Yuanbo Wang, San Diego, CA (US); Gang Xiao, San Diego, CA (US); Abhijit Navalekar, Westford, MA (US); Ashish Shankar Iyer, San Diego, CA (US); Subramanya Rao, Sunnyvale, CA (US); Srinivasan Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/820,342

(22) Filed: Nov. 21, 2017

(65) Prior Publication Data
US 2019/0159223 A1 May 23, 2019

(51) Int. Cl.
*H04W 72/12* (2009.01)
*H04W 72/04* (2009.01)
(Continued)

(52) U.S. Cl.
CPC ....... *H04W 72/1236* (2013.01); *H04W 24/08* (2013.01); *H04W 28/0236* (2013.01);
(Continued)

(58) Field of Classification Search
CPC ......... H04W 71/1236; H04W 28/0236; H04W 40/12; H04W 72/087; H04W 72/1215;
(Continued)

(56) References Cited

U.S. PATENT DOCUMENTS

| | | | |
|---|---|---|---|
| 2008/0159431 A1* | 7/2008 | Obuchi | H04B 7/0452 375/267 |
| 2010/0050034 A1* | 2/2010 | Che | H04L 1/1845 714/748 |

(Continued)

FOREIGN PATENT DOCUMENTS

WO    2016182293 A1    11/2016

OTHER PUBLICATIONS

International Search Report and Written Opinion—PCT/US2018/061963—ISA/EPO—dated Feb. 15, 2019.

*Primary Examiner* — Walter J Divito
*Assistant Examiner* — Anthony Luo
(74) *Attorney, Agent, or Firm* — QUALCOMM Incorporated

(57) ABSTRACT

A method, apparatus, and computer-readable medium at a transmitting user equipment (UE) in a distributed cellular vehicle-to-everything environment are disclosed to determine a schedule for transmissions on subchannels of multiple frequencies based on a set of UE-specific, dynamic, and performance related metrics or criteria. The metrics may include an estimated number of users on a subchannel, a best-bandwidth fit, channel loading conditions, transmission range, and quality requirements of an application, among others. Such a schedule for transmissions on subchannels of multiple frequencies may result in either an improved capacity utilization, an improved communication quality, or both.

25 Claims, 12 Drawing Sheets

(51) Int. Cl.
*H04W 40/12* (2009.01)
*H04W 72/08* (2009.01)
*H04W 28/02* (2009.01)
*H04W 24/08* (2009.01)
*H04W 4/46* (2018.01)

(52) U.S. Cl.
CPC ....... *H04W 40/12* (2013.01); *H04W 72/0486* (2013.01); *H04W 72/087* (2013.01); *H04W 72/1215* (2013.01); *H04W 72/1252* (2013.01); *B60W 2556/65* (2020.02); *H04W 4/46* (2018.02); *H04W 72/0453* (2013.01)

(58) Field of Classification Search
CPC ............. H04W 72/1236; H04W 24/08; H04W 72/1252; H04W 72/0486; H04W 4/46; H04W 72/0453; B60W 2556/65
See application file for complete search history.

(56) References Cited

U.S. PATENT DOCUMENTS

| | | |
|---|---|---|
| 2012/0087292 A1 | 4/2012 | Grimm et al. |
| 2016/0174122 A1 | 6/2016 | Sorrentino et al. |
| 2017/0013092 A1* | 1/2017 | Chen ................. H04L 5/003 |
| 2017/0126533 A1* | 5/2017 | Waheed .............. H04L 43/0894 |
| 2017/0180160 A1* | 6/2017 | Moorti ............. H04L 25/03006 |
| 2017/0367058 A1* | 12/2017 | Pelletier ............ H04W 56/0045 |
| 2018/0084369 A1* | 3/2018 | Hou ........................ H04W 4/00 |
| 2018/0139594 A1 | 5/2018 | Lee et al. |
| 2019/0215817 A1* | 7/2019 | Chae ................. H04W 56/0015 |
| 2020/0037280 A1* | 1/2020 | Enbuske ............... H04L 1/1854 |

* cited by examiner

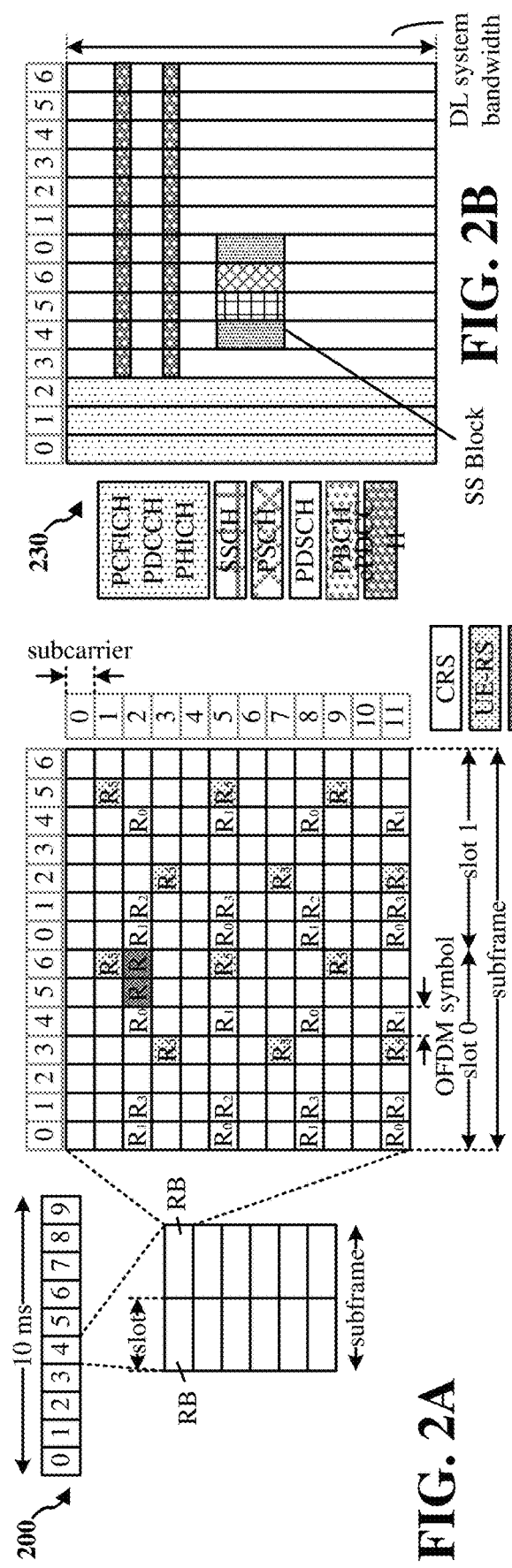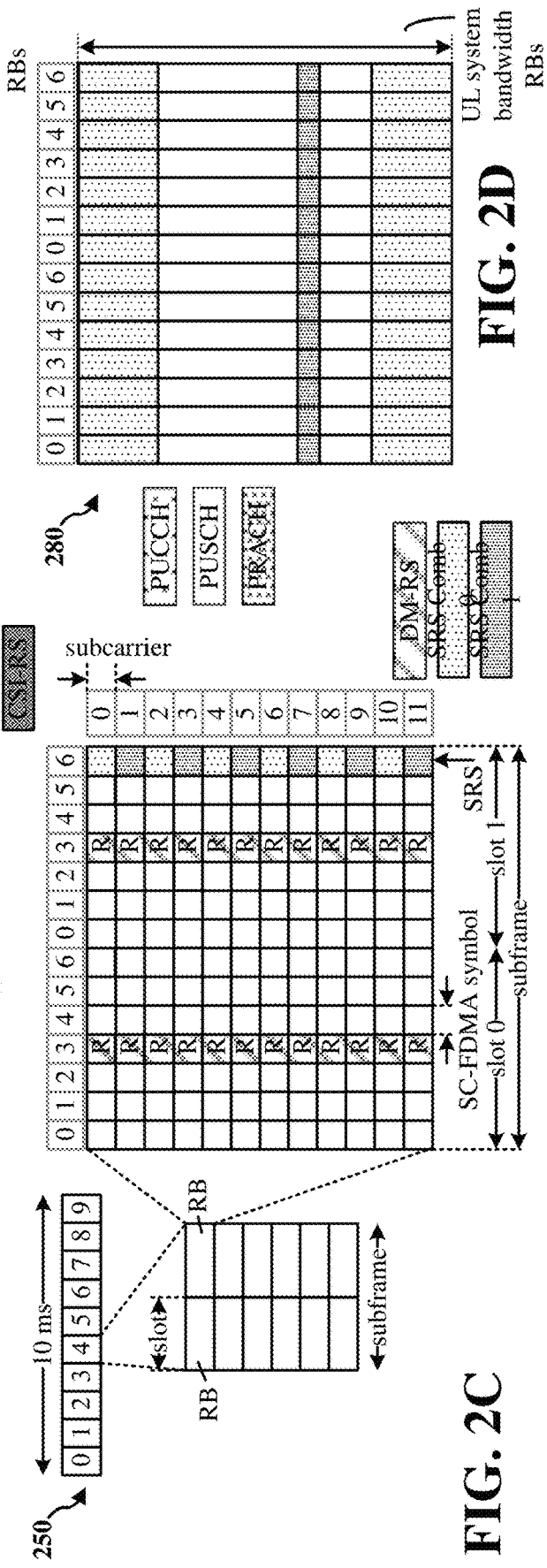

METHODS AND APPARATUSES FOR TRANSMISSION SCHEDULING ON MULTIPLE FREQUENCIES

BACKGROUND

Field

The present disclosure relates generally to communication systems, and more particularly, to a methods and apparatuses for vehicle-to-everything (V2X) transmission scheduling on multiple frequencies.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Wireless communication systems may also include, or support networks used for vehicle based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle based communications, however, may also be associated with various requirements, e.g., communication requirements, security and privacy requirements, etc. Other example requirements may include, but are not limited to, reduced latency requirements, higher reliability requirements, and the like. For example, vehicle-based communications may include communicating sensor data that may support self-driving cars. Sensor data may be used between vehicles to improve the safety of self-driving cars.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

There may be multiple transmission frequencies from different wireless technologies available to a network device in the V2X environment. One existing method for scheduling transmission frequencies in general is based on static mapping between applications and frequencies, without taking into account the instantaneous conditions of the V2X environment. For example, a GPS application of a vehicle UE may be mapped to a frequency F1 (e.g., 1 GHz) and a vehicle-to-vehicle communication application may be mapped to a frequency F2 (e.g., 5 GHz). The mappings may be static. This may result in either a poor capacity utilization, a poor communication quality, or both.

There is a need for a method, apparatus, and computer-readable medium at a user equipment (UE) in a distributed C-V2X environment to schedule transmissions on subchannels of multiple frequencies based on a set of UE-specific, dynamic, and performance related metrics or criteria. The metrics may include an estimated number of users on a subchannel, a best-bandwidth fit, channel loading conditions, transmission range, and quality requirements of an application etc.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
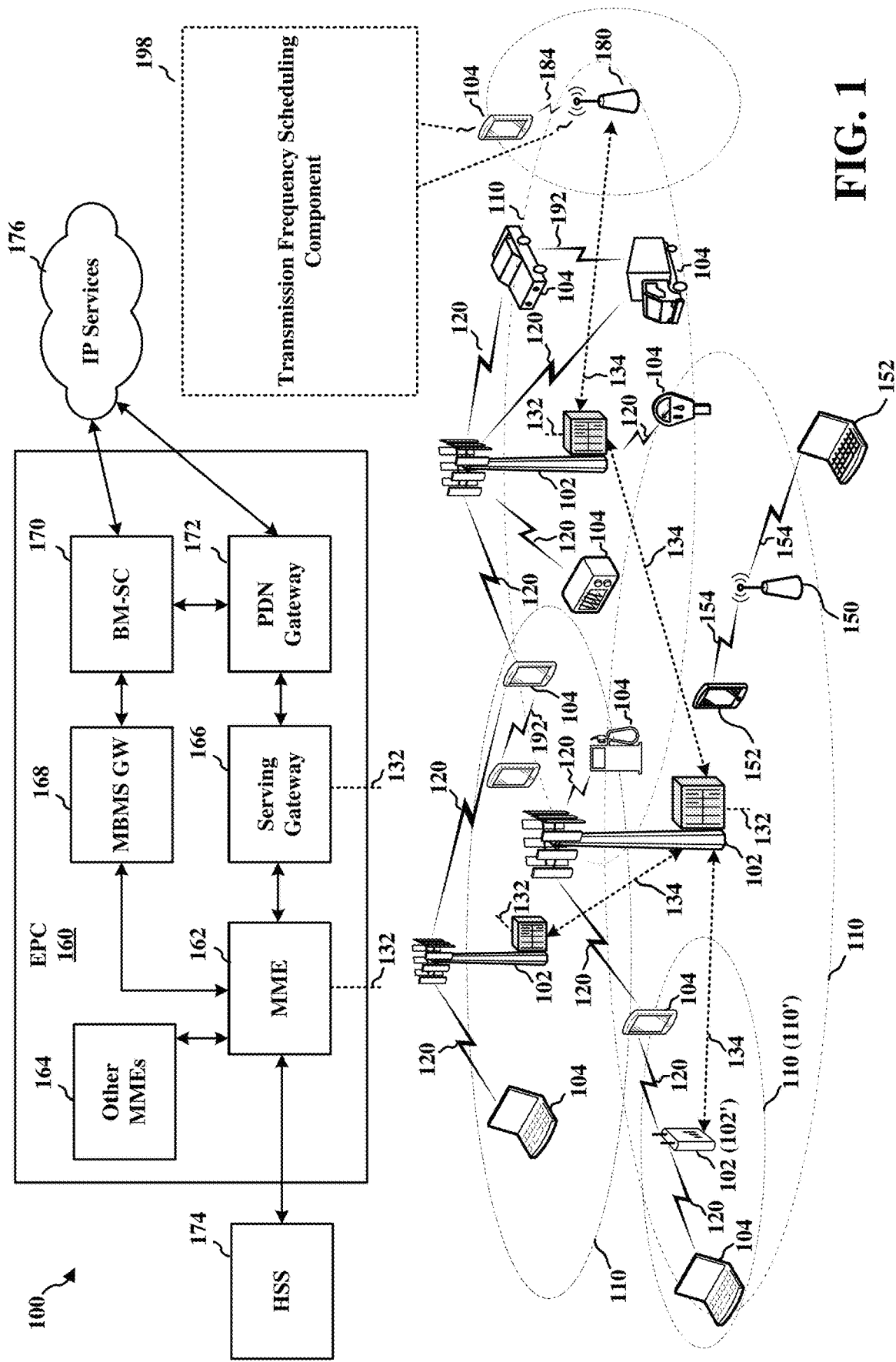
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104s may be configured to include a transmission frequency scheduling component (198) that enables the UEs 104 to schedule transmissions on multiple frequencies based on a set of dynamic and opportunistic metrics to achieve a better capacity utilization, a better communication quality, or both.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the hybrid automatic repeat request (HARQ) indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
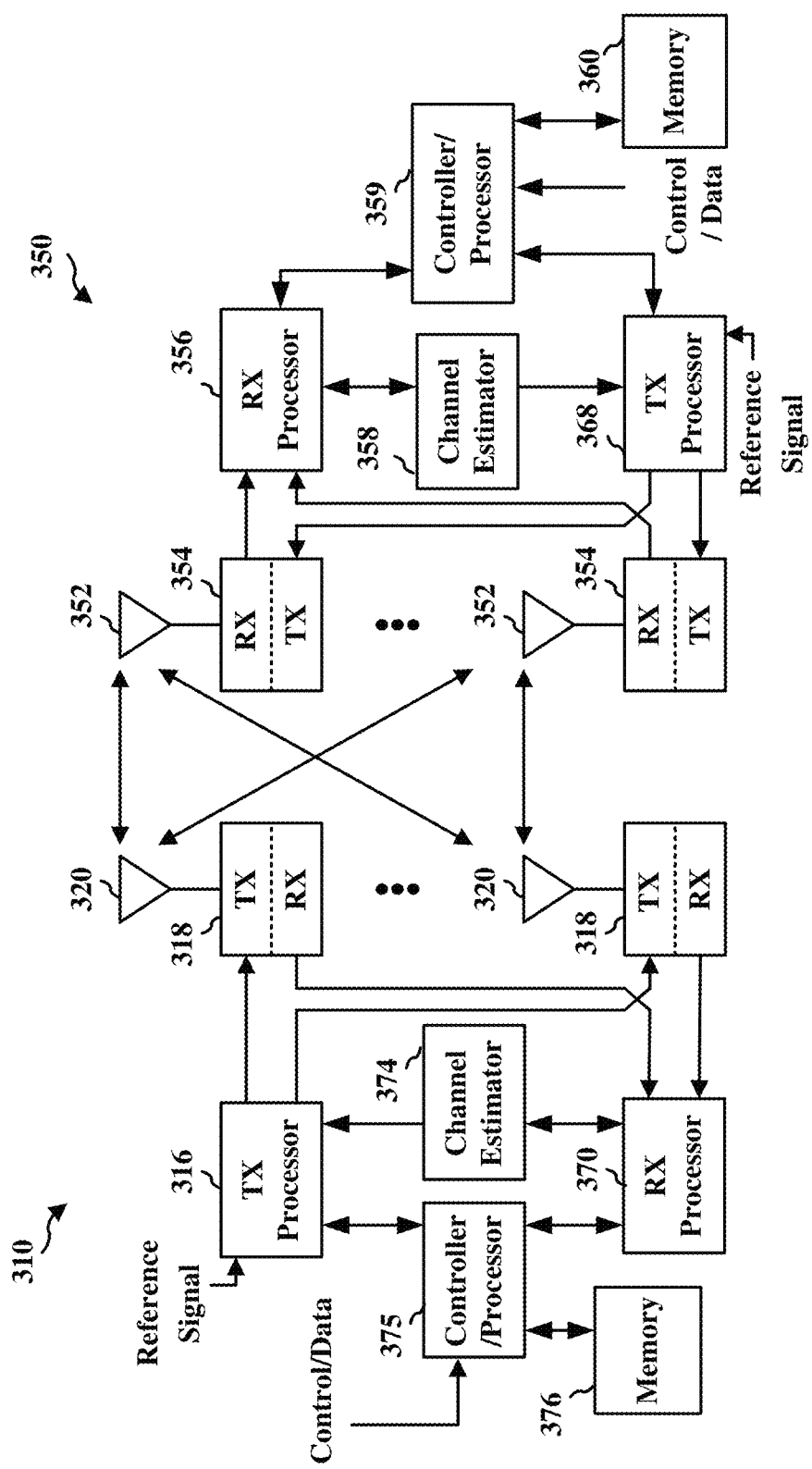
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4A:
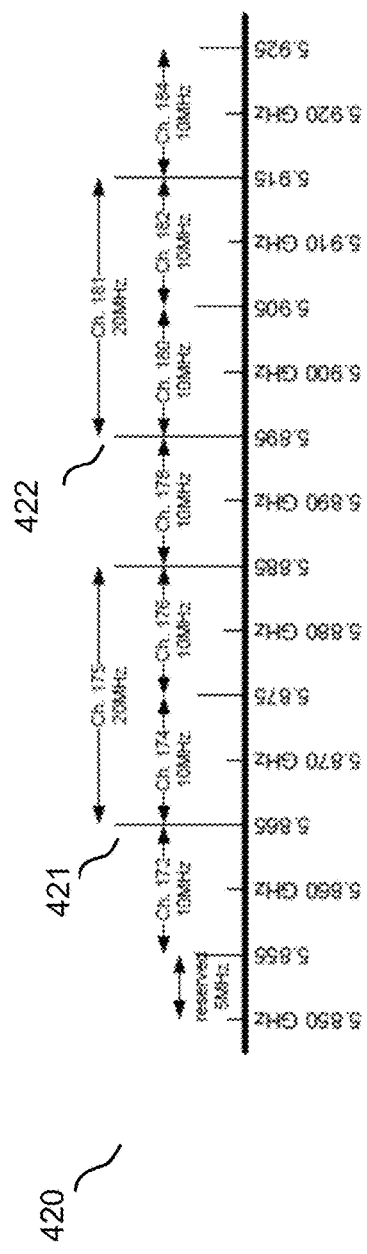
FIG. 4a illustrates an example radio frequency spectrum with dedicated portions for V2X application.

FIG. 4a illustrates an example radio frequency spectrum 420 with dedicated portions of radio frequency for V2X applications. The spectrum 420 shows a radio frequency range from 5.850 GHz to 5.925 GHz. Out of the radio frequency spectrum 420, two sections are allocated to V2X applications, that is, a 20 MHz section 421 from 5.865 GHz to 5.885 GHz, and another 20 MHz section 422 from 5.895 GHz to 5.915 GHz. Each of the two radio frequency sections 410 and 420 may be divided into multiple subchannels to be allocated to vehicle UEs. In one example scenario, the 20 MHz radio frequency 410 or 420 may be divided into 4 individual subchannels of 5 MHz each, for the V2X applications.

Specific radio frequency sections that are allocated to V2X applications may be jurisdiction specific. For example, the radio frequency sections 410 and 420 are dedicated frequency resources for V2X applications in the U.S. Different radio frequency resources may be dedicated to the V2X applications in different jurisdictions.

Figure 4B:
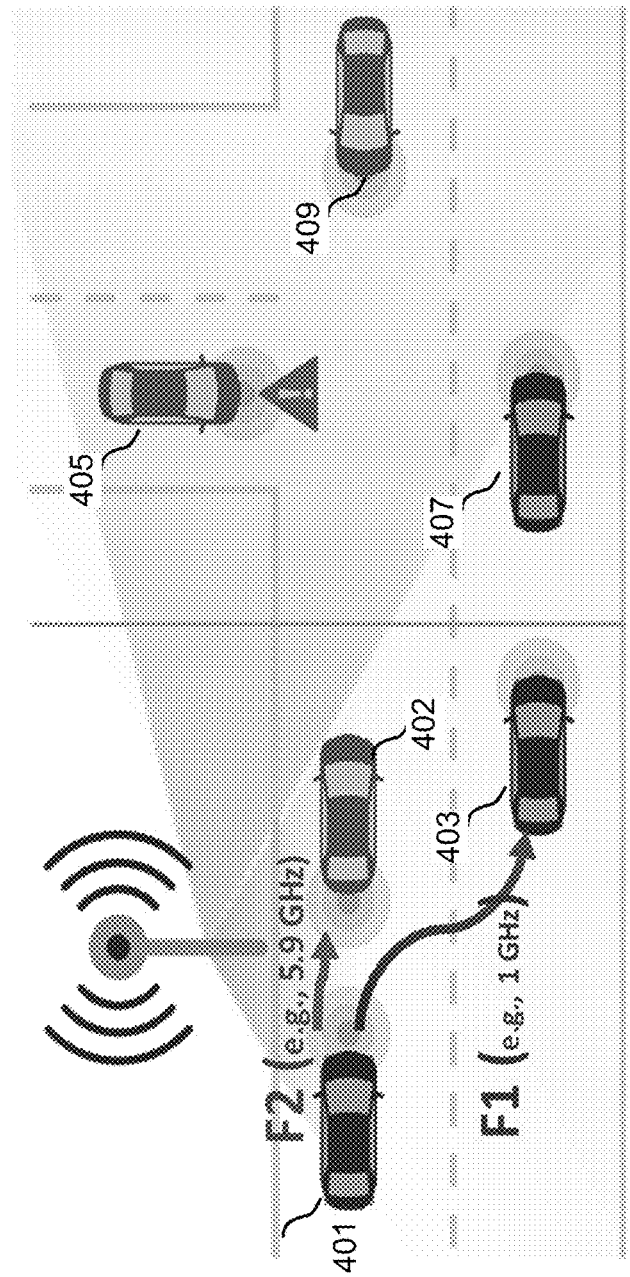
FIG. 4b illustrates an example radio frequency subchannel allocation in a V2X environment in accordance with one or more aspects of the present disclosure.

FIG. 4b illustrates an example radio frequency subchannel allocation 400 in a distributed V2X environment in accordance with one or more aspects of the present disclosure. In the example V2X environment, a vehicle UE 401 is transmitting to another vehicle UE 402 on a frequency F2 (5.9 GHz) and to a third vehicle UE 403 on a frequency F1 (1 GHz). An existing method of scheduling transmissions on the two frequencies may be to statically assign F1 or a subchannel on F1 to any UE in a neighboring lane, and F2 or a subchannel on F2 to any UE in the same lane. This static scheduling of subchannels on multiple frequencies fails to consider instantaneous traffic conditions in the intersection. For example, a vehicle UE 405 may have an emergency situation and may want to send to other approaching vehicle UEs, including vehicle UEs 401, 402, 403, 407, and 409, a high-priority, URLLC message to indicate the emergency situation. The existing method of allocating subchannels on multiple frequencies may not accommodate this situation. The existing method may statically assign a subchannel, or determine a schedule based on a received signal strength indicator (RSSI) for congestion control on the subchannel. The existing method may not take into consideration the priority of a message. Furthermore, there does not appear to be a mechanism defined that may look at the load and usage of a subchannel based on the number of users on the subchannel.

Figure 5:
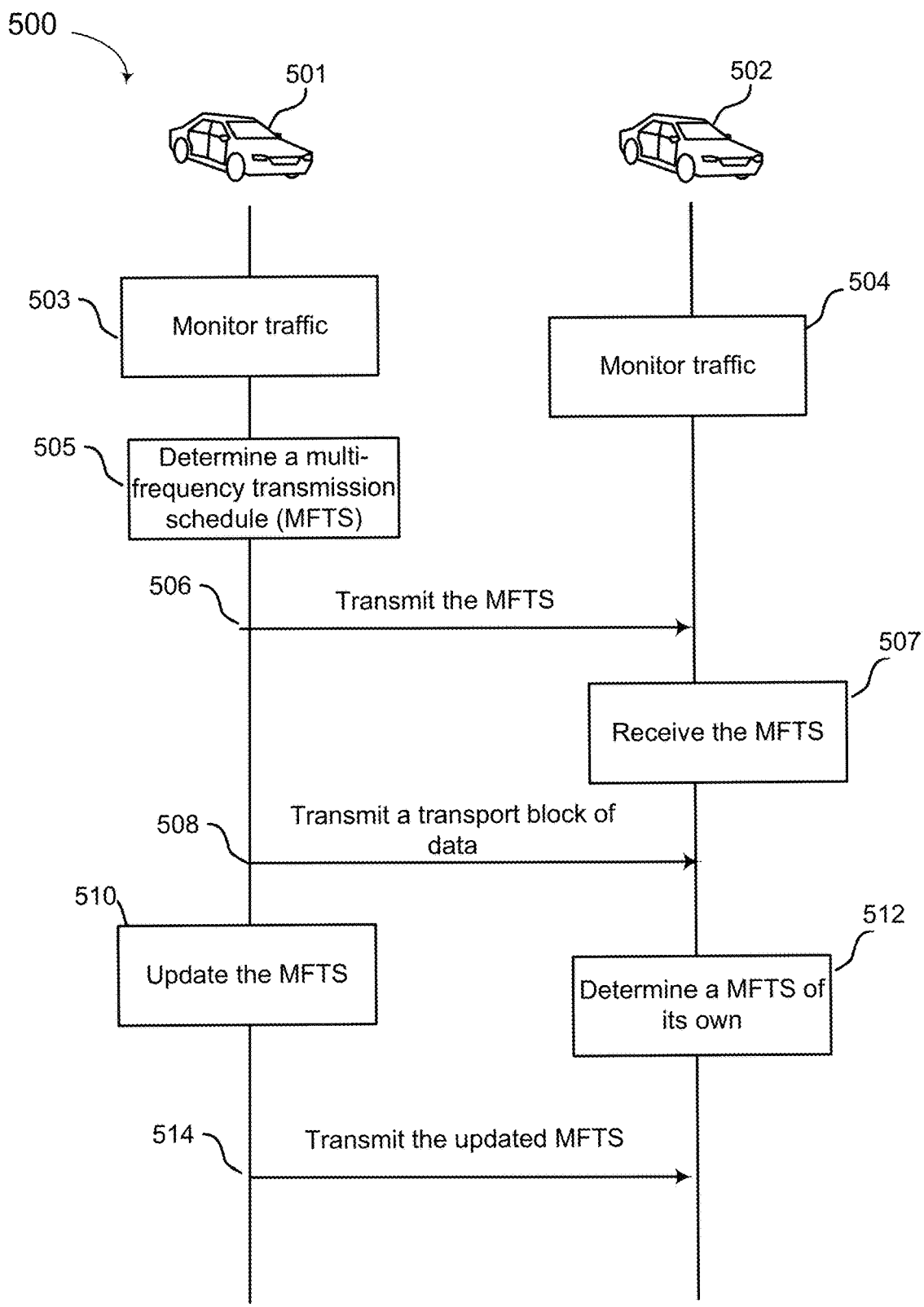
FIG. 5 illustrates an example of a wireless communications system that supports dynamic and opportunistic scheduling of transmission frequencies in a distributed C-V2X environment in accordance with one or more aspects of the present disclosure.

FIG. 5 illustrates an example of a wireless communications system 500 that supports dynamic and opportunistic scheduling of subchannels on multiple frequencies in a distributed C-V2X environment in accordance with one or more aspects of the present disclosure. The wireless communication system 500 includes a transmitting vehicle UE 501 and a receiving vehicle UE 502 in a distributed V2X environment. Either the transmitting vehicle UE 501 or the receiving vehicle UE 502 can be one of the UEs 104 of FIG. 1 or the apparatus 350 of FIG. 3.

At 503, the transmitting vehicle UE 501, monitors traffic from other UEs in the V2X environment, including the receiving vehicle UE 502. The traffic monitoring may include listening on multiple transmission frequencies supported at the UE 501 and determining the traffic load and the number of UEs listening on a subchannel. Details for determining the number of UEs on a subchannel are further illustrated in FIG. 6 and FIG. 7, and described in the corresponding sections. The traffic condition on one of the transmission frequencies is one of the metrics that the UE 501 is to consider in determining a schedule for transmission on multiple frequencies, or a multi-frequency transmission schedule (MFTS), as will be explained in more details in relevant parts of the description for FIG. 6.

In one example aspect, at 504, the receiving UE 502 may also monitor traffic condition in the V2X environment. Like the UE 501, the UE 502 is configured to transmit or receive data based on a schedule for transmissions on multiple frequencies. To either receive or determine a schedule for transmissions on multiple frequencies, the UE 502 is to know the traffic conditions on a subchannel of a transmission frequency. In one example aspect, the traffic condition detected may affect the manner in which the UE 502 receive data, as will be explained in more details in the relevant parts of the description for FIG. 10.

At 505, the UE 501 determine a schedule for transmission on multiple frequencies, or a multi-frequency transmission schedule (MFTS) based on a set of metrics. As indicated thus far, the terms frequency, transmission frequency, subchannel on a transmission frequency and similar terms are used interchangeably in the present disclosure. Thus, the phrase schedule for transmission on multiple frequencies and the phrase schedule for transmission on multiple subchannels are also used interchangeably throughout the present disclosure.

In one example aspect, a MFTS may include one or more assignments of radio frequencies or subchannels to specific applications at UEs or the UEs themselves in a distributed V2X environment. The MFTS may also include a time duration when the MFTS is valid.

In one example aspect, the metrics may include a level of fragmentation of transport block, radio frequency propagation characteristics, frequency range, transmission power level, and/or a priority of the data to be transmitted, as will be explained in more details in relevant parts of the specification for FIG. 6.

At 506, the UE 501 transmits the determined MFTS to the receiving UE 502. In one example aspect, the UE 501 transmits the determined MFTS in a broadcast message. At 507, the UE 502 receives the MFTS in a broadcast message. In the broadcast message, the UE 501 may not specifically identify the UE 502 as the receiver of the MFTS. Instead, all UEs within the range may receive the broadcast MFTS. The UE 502 may update its pattern of traffic monitoring, based on the received MFTS.

At 508, the UE 501 may transmit a transport block of data either in a broadcast message or a dedicated message to the UE 502 according to the determined MFTS. The UE 502 may receive the transmitted transport block of data based on the received MFTS. At 510, the UE 501 may update the current MFTS. The update may be triggered by an event or on schedule.

At 512, the UE 502 may determine a MFTS of its own, based on the received MFTS of the UE 501, in addition to a set of metrics the UE 502 has collected itself. For example, the UE 502 may determine that a frequency shared with the UE 501 may be very busy or is dedicated for high-priority messages, based on the MFTS from the UE 501. As a result, the MFTS may determine its own MFTS accordingly. For example, the UE 502 may schedule a frequency or a subchannel for high-priority messages that is the same as the frequency or subchannel for high-priority messages for the UE 501. At 514, the UE 501 may transmit the updated MFTS to the UE 502 and other UEs in the area in a broadcast message. In one example aspect, if the MFTS from UE 501 is in conflict with the MFTS of the UE 502, the UE 502 may modify its MFTS, as will be explained later.

Figure 6:
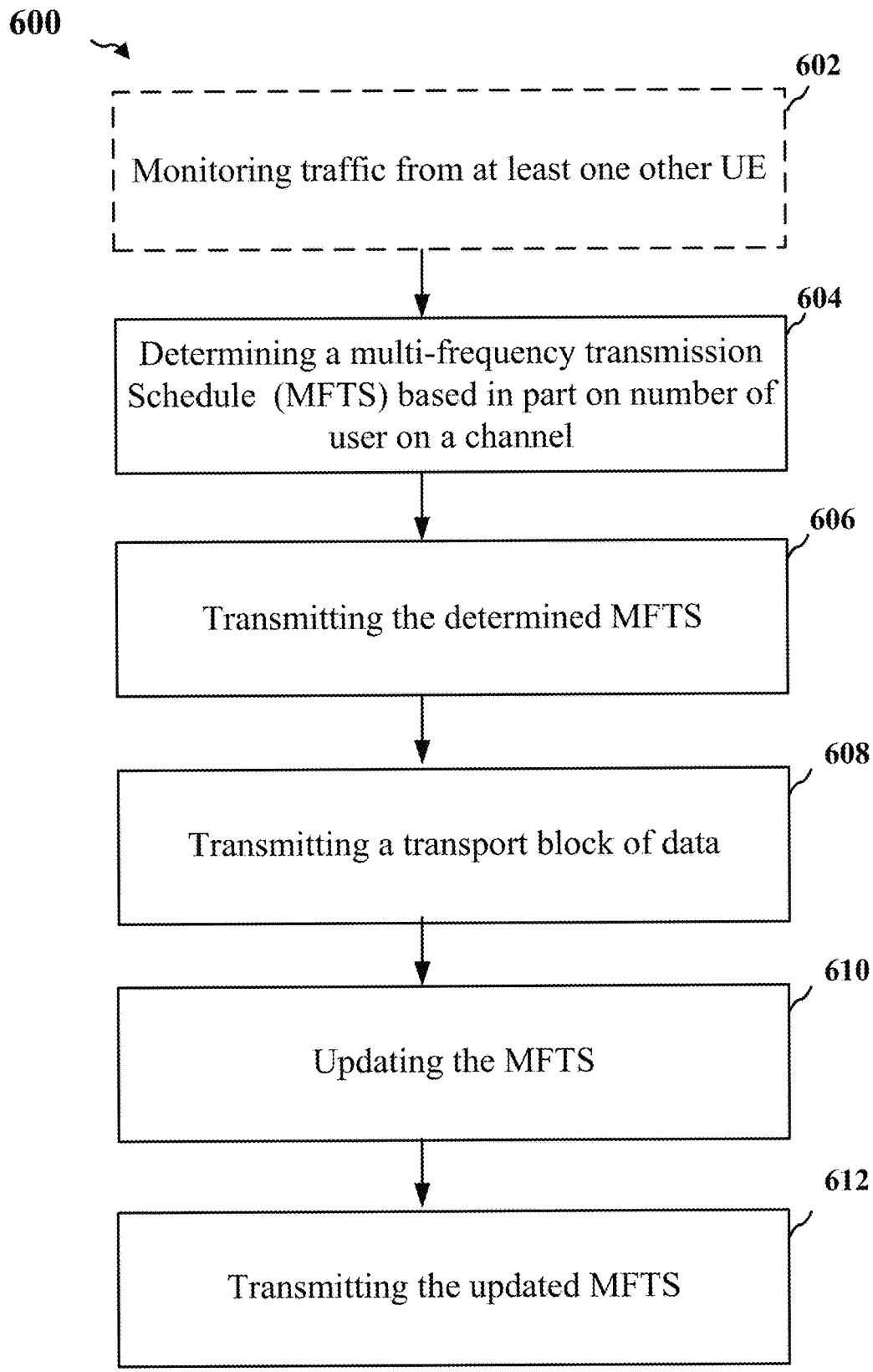
FIG. 6 is a flowchart of a method of wireless communication in accordance with one or more aspects of the present disclosure.

FIG. 6 is a flowchart of a method 600 of wireless communication. The method may be performed by one of the UEs 104 of FIG. 1, 350 of FIGS. 3, 501 and 502 of FIG. 5, or apparatus 802/802' of FIGS. 8 and 9. An optional step is indicated in a dashed boarder.

At 602, the method 600 may include monitoring traffic from at least one other UE in the distributed V2X environment, according to aspects of the present disclosure. A transmitting vehicle UE, such as the vehicle UE 501, may monitors traffic from other UEs in the V2X environment. The traffic monitoring may include listening on a subchannel of a transmission frequency supported at the transmitting UE and determining the traffic load and a number of the UEs on the subchannel of the transmission frequency. The traffic monitoring may include monitoring both broadcast messages and dedicated messages on a subchannel of a transmission frequency that the UE is to schedule. The traffic monitoring may also include the transmission quality of the subchannel of the transmission frequency. The traffic condition on the subchannel of the transmission frequency is one of the metrics that the transmitting UE may consider in determining a schedule for transmissions on multiple frequencies, or a multi-frequency transmission schedule.

At 604, the method 600 includes determining a multi-frequency transmission schedule (MFTS) based on a set of metrics. In one example aspect, determining the multi-frequency transmission schedule may include selecting a subchannel of a transmission frequency that results in a least or reduced fragmentation of a transport block of data for a given modulation and coding scheme. When the transmitting UE has one or more transport block of data to transmit, the transmitting UE may consider selecting a subchannel of a transmission frequency associated that may result in a minimum number of or reduced fragmentations of a transport block of data. For example, depending on the channel congestion or available bandwidth, transmission on frequency F1 may result in more fragmentation than that of frequency F2.

In one example aspect, determining the multi-frequency transmission schedule may include selecting a subchannel of a transmission frequency based on one or more propagation characteristics of the transmission frequency. For example, when the transmitting UE 401 intends to send a message to the UE 409, the UE that is located furthest from the UE 401, as shown in FIG. 4, the UE 401 may select a frequency that is better suitable for a longer transmission range. For example, the frequency F1 (1 GHz) has a longer transmission range than the frequency F2 (5.9 GHz).

In one example aspect, determining the multi-frequency transmission schedule may include selecting a subchannel of a transmission frequency that meets at least one quality requirement for an upper layer message. For example, when the transmitting UE 401 intends to change lane, the transmitting UE may send a URLLC message to the UE 403 in the new lane to indicates its lane-change intent so that the UE 403 does not take any action to hinder the lane change action, such as braking. The transmitting UE 401 may select a subchannel or frequency that has the best chance to successfully carry the URLLC message.

In one example aspect, determining the multi-frequency transmission schedule may include selecting a frequency in presence of baseband restriction. For example, when there are concurrent transmissions of V2X and another RAT, such as concurrent V2X+LTE or concurrent V2X+V2X, the transmitting UE may need select an appropriate frequency or subchannel in presence of transmission power splitting and some baseband restriction.

In one example aspect, determining the multi-frequency transmission schedule may also include splitting a transport block of data on multiple frequencies, based in part on a baseband restriction and transmission power allocation of the UE. For example, when the transmitting UE's battery is too low to complete the transmission of a transport block of data, the UE may split the transport block of data over two or more transmission frequencies that use less transmission power.

In one example aspect, determining the multi-frequency transmission schedule may include selecting a subchannel of a transmission frequency based on a priority of the subchannel for other UEs. For example, if other UEs in the V2X environment use the frequency F1 for high priority messages, the transmitting UE may want to avoid selecting the frequency F1 for low-priority messages.

In one example aspect, determining the multi-frequency transmission schedule may include estimating a number of UEs listening or transmitting on a subchannel and selecting the subchannel of the transmission frequency based on how densely the subchannel is populated with UEs in the distributed V2X environment. For example, if a subchannel is heavily populated, with many UEs transmitting on the same frequency or subchannel, the transmitting UE may want to avoid selecting the subchannel for transmission of a block of data. Details on how to estimate the number of UEs transmitting on a subchannel may be found in FIG. 7 and are described in the corresponding subsections.

In one example aspect, determining the multi-frequency transmission schedule may include selecting a subchannel of a transmission frequency based in part on a traffic condition on the subchannel. For example, the transmitting UE may select a subchannel that is less busy than other subchannels for transmission of a transport data block with a high priority or a need for low latency. Such a subchannel has a better chance to avoid a transmission failure due to channel congestions.

In one example aspect, determining the multi-frequency transmission schedule may include selecting a subchannel of a transmission frequency based on a need to replicate a transport block of data on more than one subchannels of one or more transmission frequencies. In some case, a UE may not support a particular frequency or the associated RAT. The transmitting UE may need to replicate a transport block of data onto a frequency or subchannel that is supported by the UE, when the transmitting UE intends to transmit the message to that UE.

In one example aspect, determining the multi-frequency transmission schedule may include selecting a subchannel of a transmission frequency based on a priority of the transport block of data. For example, if a subchannel is designated for high priority data, the transmitting UE may select this subchannel for a transport data block with a high priority. As described above, in one example aspect, a MFTS may include one or more assignments of radio frequencies or subchannels to specific applications at UEs or the UEs themselves in a distributed V2X environment. The MFTS may also include a time duration when the MFTS is valid.

The transmitting UE may use a combination of the metrics described above in determining a multi-frequency transmission schedule. In one aspect of the present disclosure, a priority may be assigned to one of the metrics and a combined priority score may be used to determine the schedule of transmission frequencies or subchannels, when multiple metrics are applicable.

At 606, the method 600 includes transmitting the determined MFTS, according to aspects of the present disclosure. In one example aspect, transmitting the MFTS may include broadcasting the multi-frequency transmission schedule to other UEs in the distributed V2X environment. Broadcasting the MFTS may have the advantage of transmission efficiency with a minimal signaling overhead. Additionally, a multi-frequency transmission schedule may be intended for all UEs in a distributed V2X environment and broadcasting is an efficient way to deliver the MFTS.

At 608, the method 600 includes transmitting a transport data block according to the determined MFTS. After a frequency is selected or assigned, the transmitting UE may use the selected frequency to transmit one or more transport blocks of data either in a broadcast message or dedicate message.

At 610, the method 600 includes updating the current multi-frequency transmission schedule. An MFTS may be a semi-persistent schedule, because the MFTS may stay for a fixed period of time. In one example aspect, updating the MFTS may be based on a predetermined schedule. For example, when a timer for a predetermined time period expires, the transmitting UE may re-evaluate the set of metrics, as described before, and determine a new MFTS based on the set of metrics. In another example, the condition that the number of users on the subchannel exceeds a predetermined threshold may also trigger a re-evaluation of the metrics.

In another example aspect, the updating of the MFTS may be triggered by an event. For example, when a vehicle UE intends to suddenly apply brake and stop, the V2X environment may have changed. The UE may have a need to re-evaluate the MFTS to reflect the new conditions in the environment.

Finally, at 612, the method 600 may include transmitting an updated MFTS. The transmitting UE may transmit the updated MFTS in a broadcast message, as in the case for the original MFTS.

The flowchart 600 is for illustration purpose and shows one possible process for determining a MFTS. In practice, one or more steps shown in illustrative flowchart 600 may be combined with other steps, performed in any suitable order, performed in parallel (e.g., simultaneously or substantially simultaneously), or removed. For example, monitoring traffic conditions at 602 may be performed in parallel to or after determining a MFTS at 604.

Figure 7:
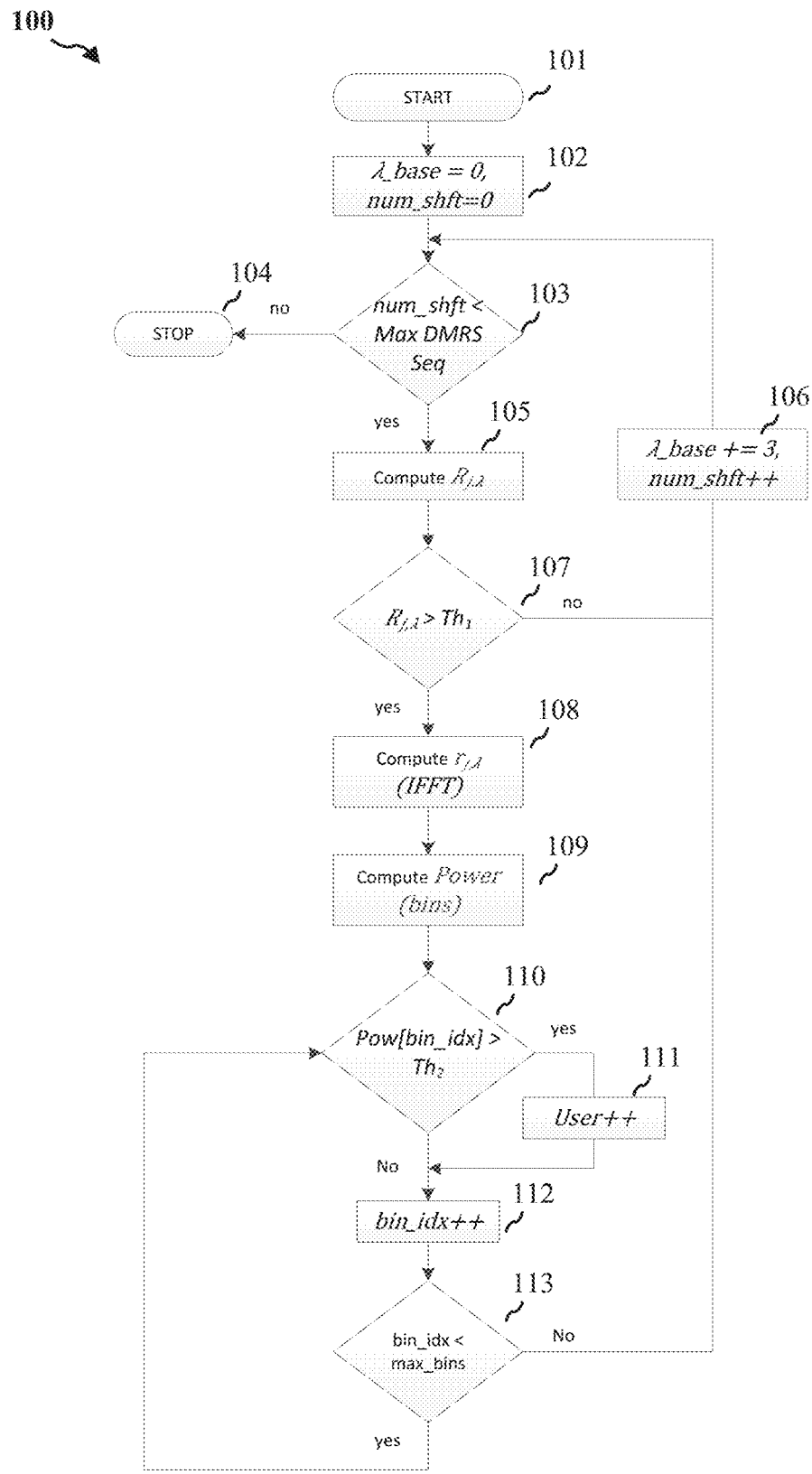
FIG. 7 is a flowchart of a process for determining a number of active users transmitting on a channel in accordance with one or more aspects of the present disclosure.

FIG. 7 is a flowchart for a process 700 for determining a number of active users transmitting on a subchannel in accordance with one or more aspects of the present disclosure. The process 700 is intended to determine the number of active UEs transmitting on a particular subchannel during a fixed period, such as a subframe. The process 700 makes use of information in a demodulation reference signal (DMRS). In one example, DMRS has four bits indicating the number of the UEs that may be transmitting at the same time during the subframe and can be received by the UE. At 701, the process 700 starts for each subframe received at a vehicle UE such as the UE 104 of FIG. 1, or any of the vehicle UEs in FIG. 4b in order to determine a number of active users transmitting on a subchannel that the vehicle UE is monitoring.

At 703, the UE determines whether a maximum number of DMRS sequences has been reached. Each UE may transmit a DMRS sequence to a receiving entity when the UE transmits data. The DMRS sequence enables the receiving entity to demodulate the received data. Each DMRS sequence is unique and the maximum number of DMRS sequences indicates the max number of UEs that can transmit at the same time. If the maximum number of DMRS sequences is reached, the process 700 terminates at 704.

Otherwise, the vehicle UE determines whether a valid signal has been received by computing a correlation value $R_{j,\lambda}$ at 705 and comparing the correlation value against a predetermined threshold at 707. The correlation value $R_{j,\lambda}$ may generally indicate whether the received signal is a valid one by computing how much the signal is related to a particular DMRS sequence. Higher the correlation value, more likely the received signal indicates a valid UE transmission.

In one example aspect, the correlation value $R_{j,\lambda}$ is computed as follows:

$$R_{j,\lambda} = \sum_{a=0,1} \sum_{j=0,1,2,3} \| Y_j^a \cdot (R_{j,n_{CS,\lambda}})^H \|$$

Where j is a symbol index, $\lambda$ is cyclic shift, $Y_j^a$ is the signal received at antenna a in the frequency domain, and $R_{j,n_{CS,\lambda}}$ is a DMRS sequence in the frequency domain.

When the vehicle UE determines that received signal is a valid one transmitted by a UE on the subchannel that the vehicle UE is monitoring, the vehicle UE further determines an Inverse Fast Fourier Transformation value (IFFT) $h_{j,\lambda}$ at 708 to identify unique peaks based on a predetermined bin size while each bin represents x units of time. A peak value is calculated over a period of time (a x units of time) to avoid detection of a spurious signal.

Furthermore, the received power of a signal is computed at 709 for all bins and then compared against a threshold for each of the bins at 710 to determine if this is a valid UE transmission. If the received power of the signal is greater than the threshold, the valid user count is incremented at 711 to indicate a UE transmitting on the subchannel has been identified. If the received power is not greater than the threshold, the bin index is incremented at 712 to test the received signal power for the next bin, unless a maximum bin number has been reached at 713. If the maximum bin number has been reached for this received signal, the DMRS index is incremented at 706 and the process 700 is repeated for the next DMRS sequence.

Figure 8:
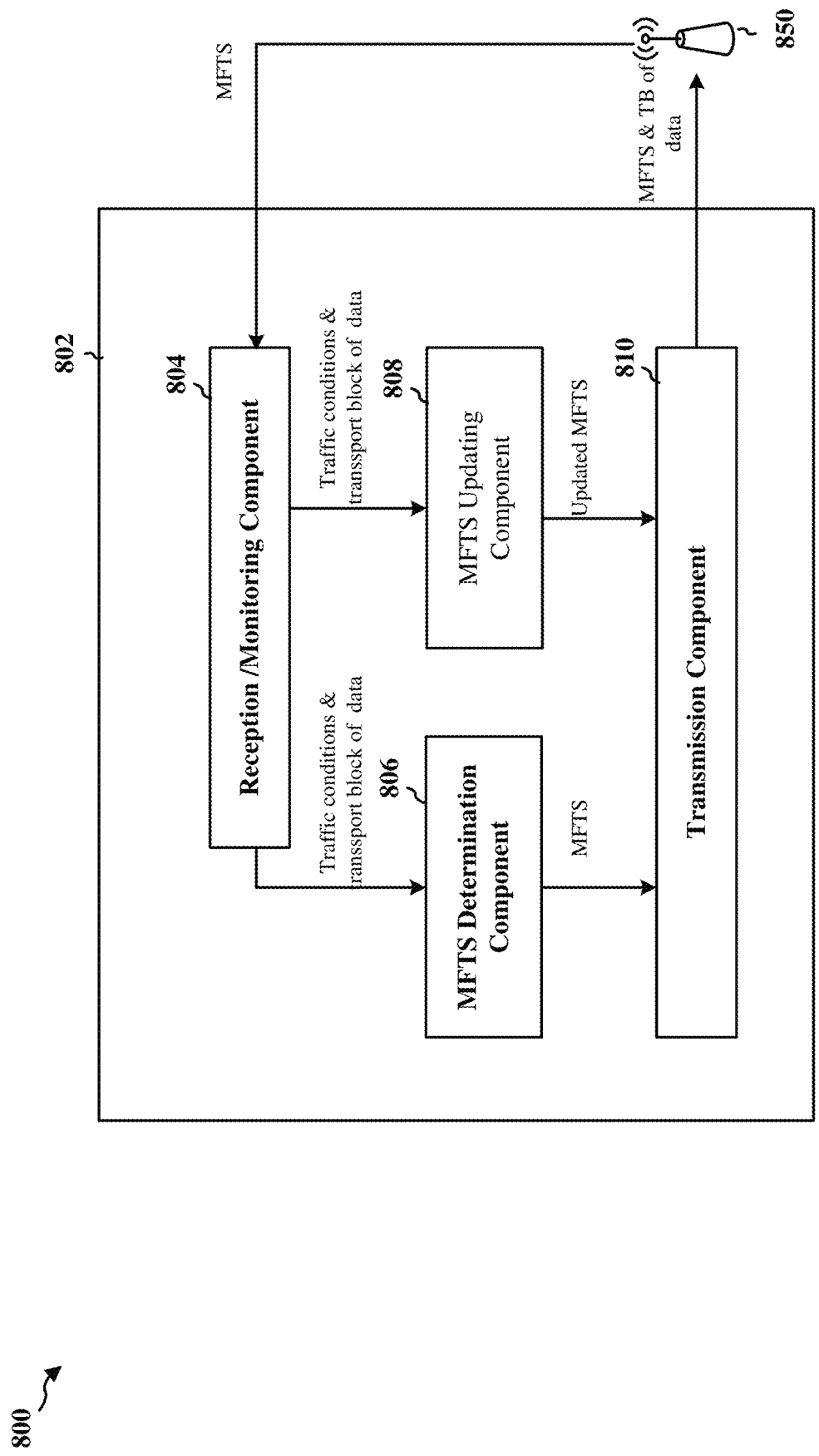
FIG. 8 is a conceptual data flow diagram illustrating the data flow between different means/components in an exemplary apparatus in accordance with one or more aspects of the present disclosure.

FIG. 8 is a conceptual data flow diagram 800 illustrating the data flow between different means/components in an exemplary apparatus 802. The apparatus may be a UE in a distributed V2X environment. The apparatus includes a reception/monitoring component 804 that is configured to receive regular data or multi-frequency transmission schedule from another network device in the distributed V2X environment, and perform monitoring of other UE. For example, the reception/monitoring component 804 of a vehicle UE may receive URLLC data to inform this vehicle UE that a neighbor vehicle UE is about to change its lane. Furthermore, the reception/monitoring component 804 may also monitor traffic condition in the V2X environment.

The apparatus 802 also includes a MFTS determination component 806 that receives traffic conditions and transport blocks of data from the reception/monitoring component 804 and determines a multi-frequency transmission schedule for transmitting the transport blocks of data using multiple frequencies available at the vehicle UE. The apparatus 802 also includes a MFTS updating component 808 that receives traffic conditions and transport blocks of data from the reception/monitoring component 804, and update a current multi-frequency transmission schedule. The apparatus 802 further includes the transmission component 810 that transmits the determined or updated MFTS and regular data to the UEs in the V2X environment, such as the UEs in the distributed V2X environment of FIG. 4.

The apparatus may include additional components that perform each of the blocks of the algorithm in the aforementioned flowcharts of FIGS. 5, 6, and 7. As such, each block in the aforementioned flowcharts of FIGS. 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
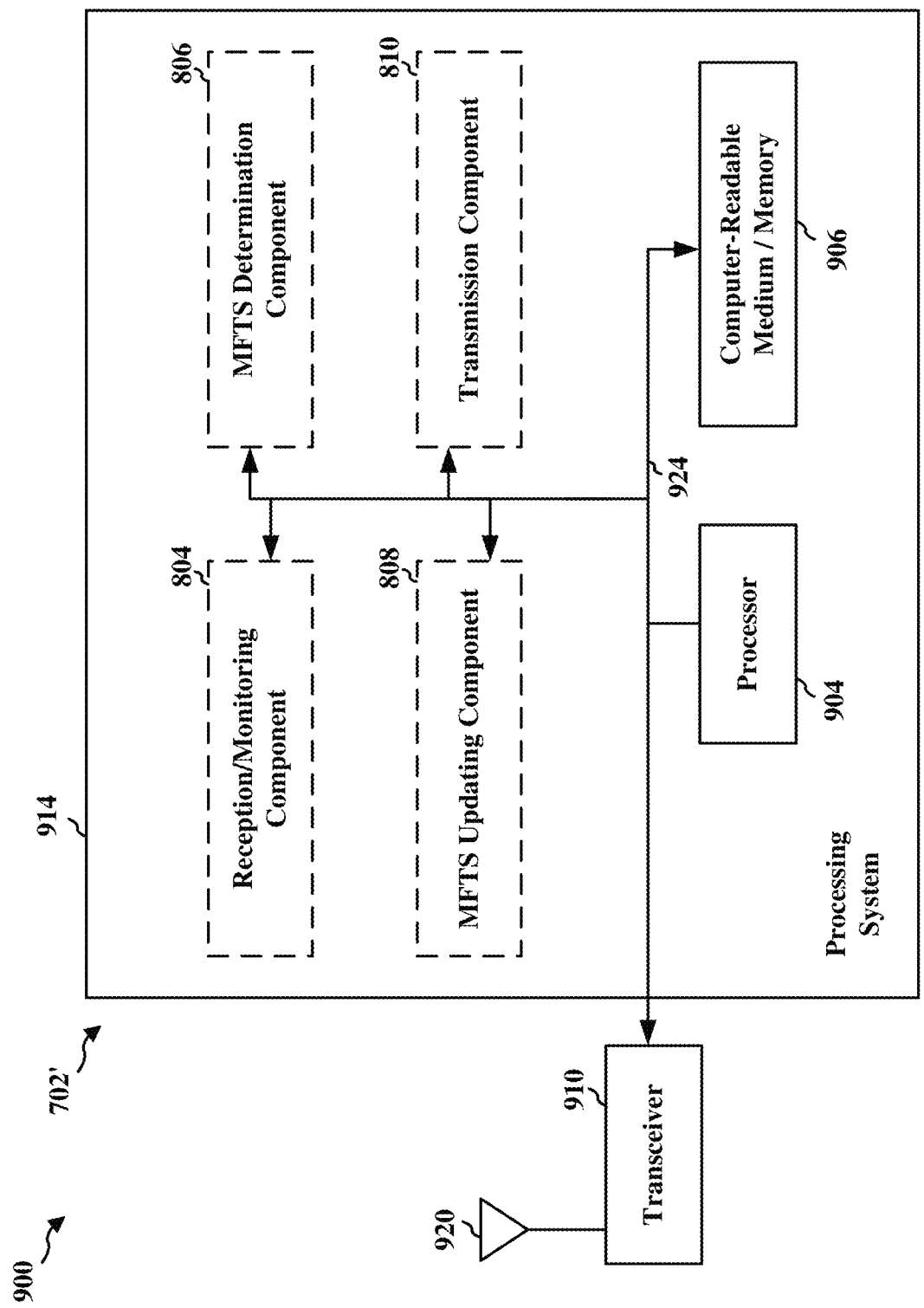
FIG. 9 is a diagram illustrating an example of a hardware implementation for an apparatus employing a processing system in accordance with one or more aspects of the present disclosure.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the transmission component 810. In addition, the transceiver 910 receives information from the processing system 914, specifically the reception/monitoring component 804, and based on the received information, generates a signal to be applied to the one or more antennas 920.

The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, and 810. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

Figure 10:
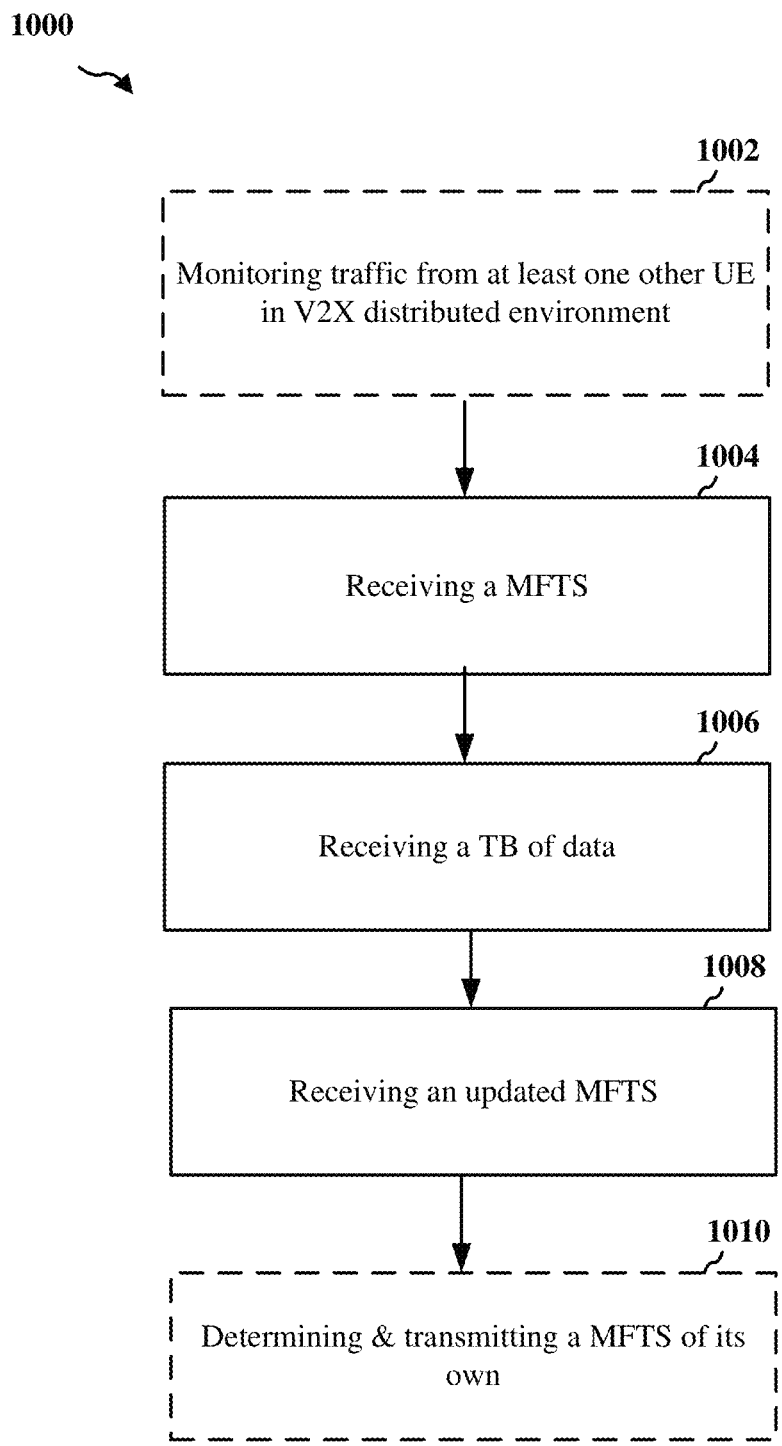
FIG. 10 is a flowchart of a method of wireless communication in accordance with one or more aspects of the present disclosure.

FIG. 10 is a flowchart of a method 1000 of wireless communication. The method may be performed by one of the UEs 104 of FIG. 1, the UE 350 of FIG. 3, the UEs 501 or 502 of FIG. 5, or apparatus 802/802' of FIGS. 8 and 9. An optional step is indicated in a dashed boarder.

At 1002, the method 1000 may include monitoring traffic from at least one other UE in the distributed V2X environment, according to aspects of the present disclosure. A receiving vehicle UE, such as the vehicle UE 502, may monitors traffic from other UEs in the V2X environment. The traffic monitoring may include listening on a subchannel supported at the receiving UE and determining the traffic load and the number of the UEs listening on the subchannel. The traffic monitoring may include monitoring both broadcast messages and dedicated messages on a subchannel. The traffic monitoring may also include monitoring for the transmission quality on the subchannel. The traffic condition on the subchannel is one of the metrics that the transmitting UE may consider in determining a multi-frequency transmission schedule.

At 1004, the method 1000 includes receiving a MFTS from a transmitting UE, such as the UE 501 of FIG. 5. The received MFTS is based on a set of metrics. For example, the received MFTS may depend on whether a selected subchannel results in a least or reduced fragmentation of a transport block of data for a modulation and coding scheme.

In another example aspect, the received MFTS may depend on one or more propagation characteristics of the subchannel of the transmission frequency, such as transmission range. For example, when the transmitting UE 401 intends to send a message to the UE 409, the furthest UE as shown in FIG. 4, the UE 401 may select a frequency that is better suitable for a longer transmission range. For example, the frequency F1 (1 GHz) may have a longer transmission range than the frequency F2 (5.9 GHz).

In another example aspect, the received MFTS may depend on whether a selected subchannel meets at least one quality requirement for an upper layer message. For example, when the transmitting UE 401 intends to change lane, the transmitting UE may send a URLLC message to the UE 403 in the new lane to indicates its lane-change intent, so the UE 403 does not take any action to hinder the lane change action, such as braking. The transmitting UE 401 may select a frequency that has the best chance to successfully carry the URLLC message.

In one example aspect, the received MFTS may indicate whether a data flow is split across multiple transmission frequencies. For example, when there are concurrent transmissions of V2X and another RAT, such as concurrent V2X+LTE or concurrent V2X+V2X, the transmitting UE may need select an appropriate frequency or subchannel in presence of transmission power splitting and some baseband restriction.

In one example aspect, the received multi-frequency transmission schedule may also indicates a splitting of a transport block of data on multiple frequencies, based in part on a baseband restriction and/or transmission power allocation of the UE. For example, when the transmitting UE's battery is too low to complete the transmission of a transport block of data, the UE may split the transport block of data over another subchannel that use less transmission power.

In one example aspect, the received MFTS may depend on the number of UEs listening or transmitting on a subchannel. For example, if a subchannel is heavily populated, with many UEs on the same subchannel, the transmitting UE may want to avoid using the subchannel.

In one example aspect, the received MFTS may depend in part on a traffic condition on the subchannel. For example, the transmitting UE may select a subchannel that is less busy than other subchannel for transmission of a transport data block that has a high priority or requires low latency. Such a subchannel has a better chance in avoiding a transmission failure due to channel congestion or interferences.

In one example aspect, the received MFTS may depend on whether there is a need to replicate a transport block of data on more than one subchannel. The more than one subchannels may be on a same or different frequency. In some case, a UE may not support a particular frequency or the associated RAT. If the receiving UE does not support a frequency that the transmitting UE is transmitting on, the transmitting UE may need to replicate the transport block of data onto a frequency that is supported by the receiving UE.

The received MFTS may depend on a combination of the metrics described above in determining the multi-frequency transmission schedule. In one aspect of the present disclosure, a priority may be assigned to one of the metrics and a combined priority score may be used to determine a schedule of subchannels for a transport block of data, when multiple metrics may be applicable.

At 1006, according to some aspects of the present disclosure, the method 1000 includes receiving a transport block of data based on the received MFTS. The received MFTS indicates which subchannel the receiving UE shall listen to and receive the transport block of data from.

At 1008, according to some aspects of the present disclosure, the method 1000 includes receiving an updated MFTS. Receiving the updated MFTS may be at a fixed interval or at occurrence of an event. For example, when a timer for a predetermined time period expires, the transmitting UE may re-evaluate the set of metrics, as described above, and determine a new MFTS based on the set of metrics.

In another example aspect, receiving the updated MFTS may be triggered by an event. For example, when a vehicle UE suddenly applies brake and stops, the V2X environment may have changed substantially. The transmitting UE may have a need to re-evaluate the MFTS to reflect the new conditions in the environment. The receiving UE may first receive a notification of the updated MFTS upon the occurrence of the event.

At 1010, according to some aspects of the present disclosure, the method 1000 may include determining and transmitting a MFTS of its own. The receiving UE may determine a MFTS of its own based on the similar metrics as described for the transmitting UE. The receiving UE may also determine its MFTS based on the MFTS received from the transmitting UE. For example, the UE 502 may determine that a frequency shared with the UE 501 may be very busy or is dedicated for high-priority messages, based on the MFTS from the UE 501. As a result, the receiving UE may determine its own MFTS accordingly. For example, the UE 502 may schedule the same frequency for high-priority messages.

The flowchart 1000 is for illustration purpose and shows one possible process for configuring and transmitting a URLLC transmission unit. In practice, one or more steps shown in illustrative flowchart 1000 may be combined with other steps, performed in any suitable order, performed in parallel (e.g., simultaneously or substantially simultaneously), or removed. For example, monitoring traffic conditions at 1002 may be performed in parallel to or after receiving a MFTS at 1004.

Figure 11:
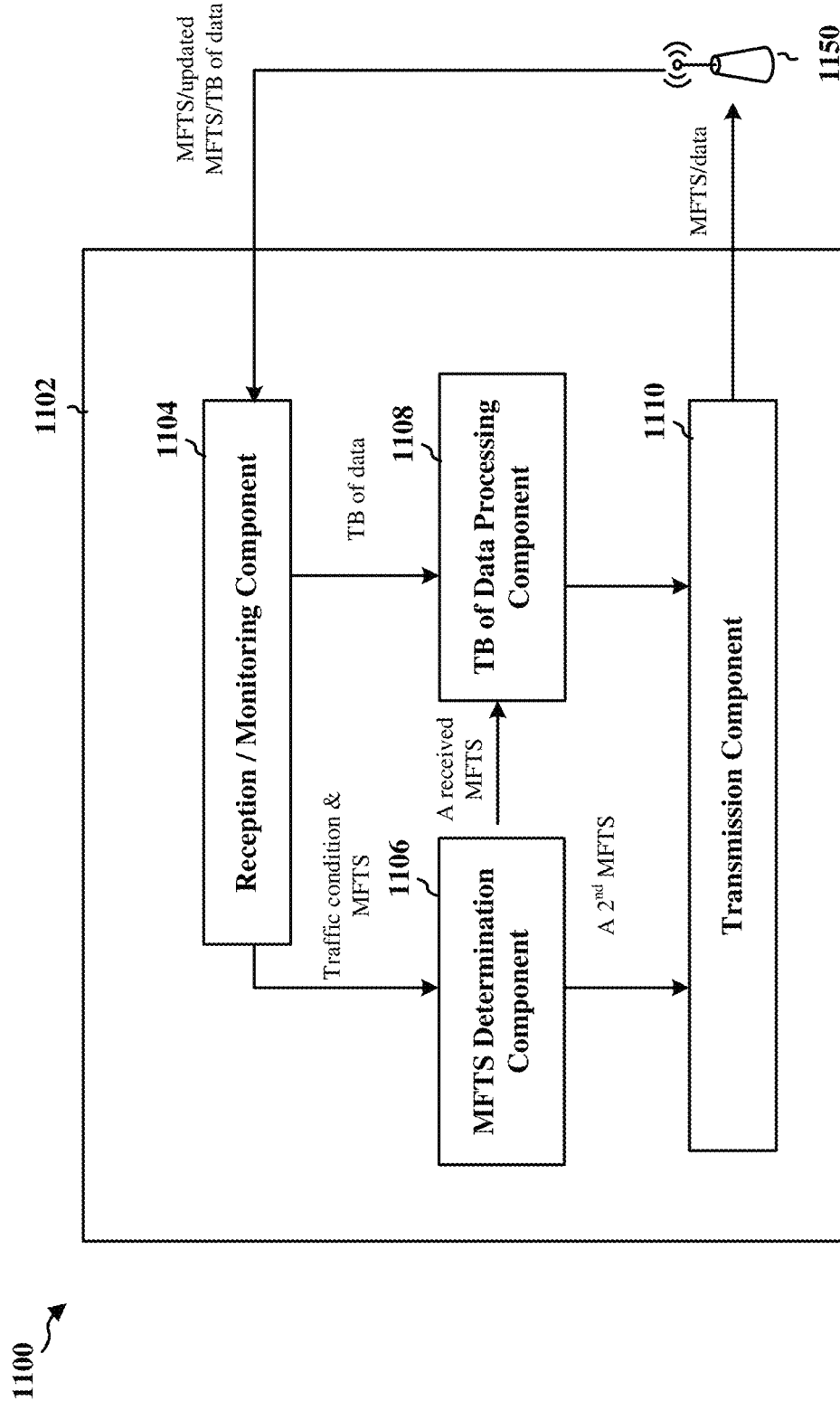
FIG. 11 is a conceptual data flow diagram illustrating the data flow between different means/components in an exemplary apparatus in accordance with one or more aspects of the present disclosure.

FIG. 11 is a conceptual data flow diagram 1100 illustrating the data flow between different means/components in an exemplary apparatus 1102. The apparatus may be a UE in a distributed V2X environment. The apparatus includes a reception/monitoring component 1104 that is configured to receive regular data or multi-frequency transmission schedule from another network device in the distributed V2X environment, and perform monitoring of other UEs in the V2X environment. For example, the reception/monitoring component 1104 of a vehicle UE may receive transport block of data to inform this vehicle UE that a neighbor vehicle UE is about to change its lane. Furthermore, the reception/monitoring component 1104 may also monitor traffic condition in the V2X environment.

The apparatus 1102 also includes a MFTS determination component 1106 that receives traffic conditions, transport blocks of data, and a MFTS from a transmitting UE, and determines a multi-frequency transmission schedule of its own. The apparatus 1102 also includes a Transport Block (TB) of Data Processing component 1108 that receives transport blocks of data from the reception/monitoring component 1104, and a received MFTS from the MFTS Determination Component 1106. The apparatus 1102 further includes the transmission component 1110 that transmits the determined MFTS and regular data to a UE 1150 in the distributed V2X environment.

The apparatus 1102 may include additional components that perform each of the blocks of the algorithm in the aforementioned flowcharts of FIGS. 5 and 10. As such, each block in the aforementioned flowcharts of FIGS. 5 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
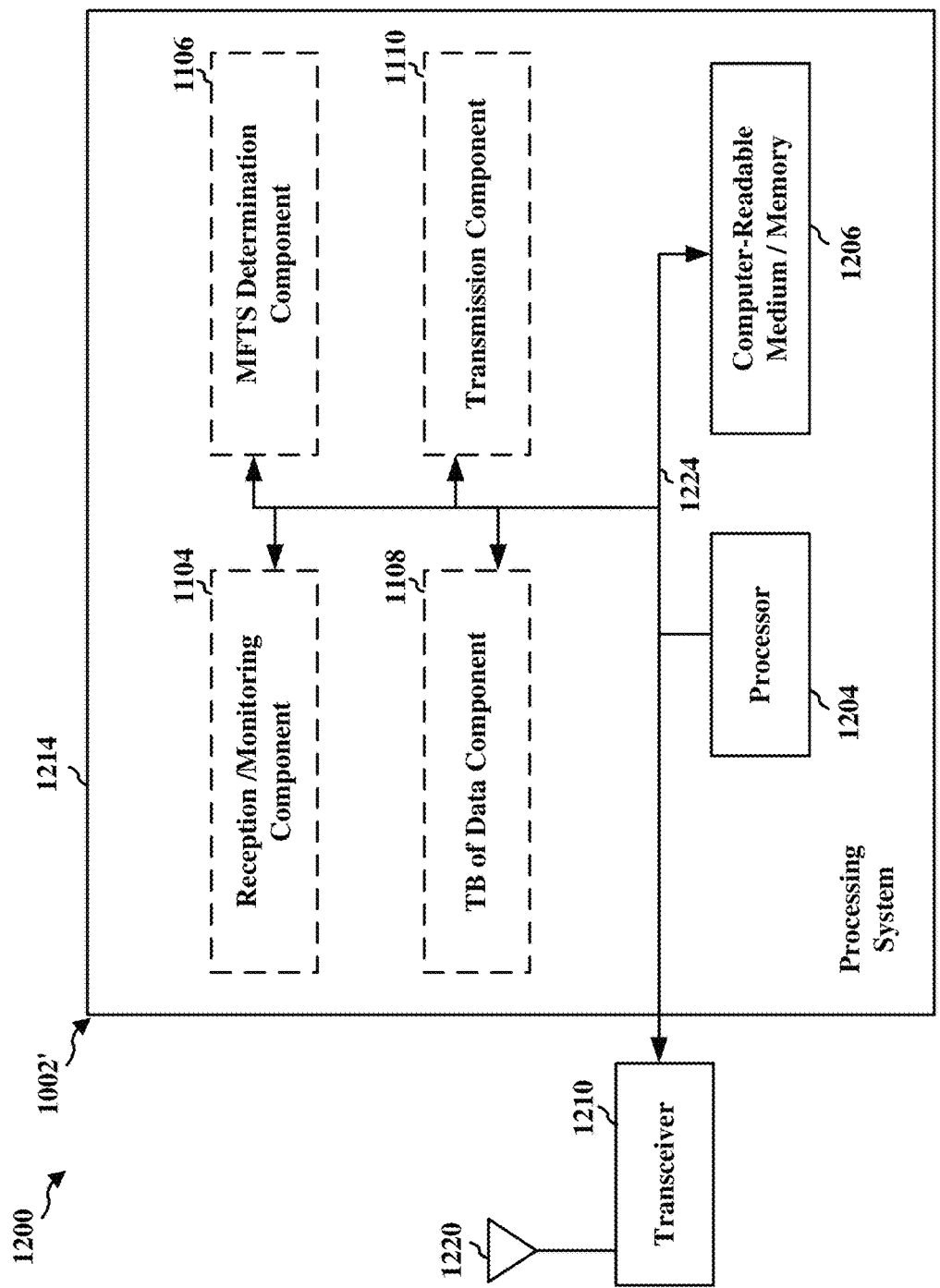
FIG. 12 is a diagram illustrating an example of a hardware implementation for an apparatus employing a processing system in accordance with one or more aspects of the present disclosure.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and 1110, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception/monitoring component 1004. In addition, the transceiver 1210 receives information from the processing system 1214, specifically the transmission component 1010, and based on the received information, generates a signal to be applied to the one or more antennas 1220.

The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1004, 1006, 1008, and 1010. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed:

1. A method of wireless communication by a user equipment (UE), comprising:
   determining a number of users on each of one or more subchannels based in part on one or more of: a received demodulation reference signal, a received power during a predetermined time period, and a number of packets successfully decoded;
   determining by the UE a multi-frequency transmission schedule based at least in part on the determined number of users on the subchannel, wherein determining the multi-frequency transmission schedule comprises assigning the one or more subchannels of multiple transmission frequencies of different wireless technologies to the UE in such a way that results in a reduced number of fragmentations of a transport block of data for communications with at least one other UE in a distributed vehicle-to-everything (V2X) environment;
   transmitting by the UE the multi-frequency transmission schedule directly to the at least one other UE; and
   transmitting by the UE the transport block of data based on the multi-frequency transmission schedule.

2. The method of claim 1, wherein determining the multi-frequency transmission schedule comprises selecting at least one subchannel of one frequency for transmission of at least one transport block of data and the multi-frequency transmission schedule is a semi-persistent schedule or an event-driven schedule.

3. The method of claim 1, further comprising at least one of:
   monitoring traffic of the at least one other UE in the distributed V2X environment;
   updating the multi-frequency transmission schedule based in part on one or more of: an event, a timer, and a triggering condition that the number of users exceeds a predetermined threshold; and
   transmitting the updated multi-frequency transmission schedule to the at least one UE in the distributed V2X environment.

4. The method of claim 1, wherein determining the multi-frequency transmission schedule comprises selecting a subchannel of a transmission frequency based on one or more propagation characteristics of the transmission frequency, the characteristics comprising a range and transmission quality of the subchannel of transmission frequency.

5. The method of claim 1, wherein determining the multi-frequency transmission schedule comprises selecting a subchannels appropriate for a presence of multiple concurrent transmissions and a baseband restriction.

6. The method of claim 1, wherein determining the multi-frequency transmission schedule comprises selecting a subchannel of a transmission frequency based in part on a traffic condition on the subchannel, a priority of the transport block of data and a priority of the transmission frequency by other UEs.

7. The method of claim 1, wherein determining the multi-frequency transmission schedule comprises selecting a subchannel of a transmission frequency based on whether the transport block of data is to be replicated on more than one subchannel.

8. The method of claim 1, wherein transmitting the multi-frequency transmission schedule further comprises broadcasting the multi-frequency transmission schedule to at least one other UE in the distributed V2X environment.

9. An apparatus for wireless communication at a user equipment (UE), comprising:
   means for determining a number of users on each of one or more subchannels based in part on one or more of: a received demodulation reference signal, a received power during a predetermined time period, and a number of packets successfully decoded;
   means for determining by the UE a multi-frequency transmission schedule based at least in part on the determined number of users on the subchannel, wherein determining the multi-frequency transmission schedule comprises assigning the one or more subchannels of multiple transmission frequencies of different wireless technologies to the UE in such a way that results in a reduced number of fragmentations of a transport block of data for communications with at least one other UE in a distributed vehicle-to-everything (V2X) environment;
   means for transmitting by the UE the multi-frequency transmission schedule to at least one other UE; and
   means for transmitting by the UE the transport block of data based on the multi-frequency transmission schedule.

10. The apparatus of claim 9, wherein means for determining the multi-frequency transmission schedule further comprises selecting at least one frequency for transmission of at least one transport block of data and the multi-frequency transmission schedule is a semi-persistent schedule or an event-driven schedule.

11. The apparatus of claim 9, further comprising at least one of:
   means for monitoring traffic of the at least one other UE in the distributed V2X environment;
   means for updating the multi-frequency transmission schedule based in part on one or more of: an event, a timer and a triggering condition that the number of users on the subchannel exceeds a predetermined threshold; and
   means for transmitting the updated multi-frequency transmission schedule to the at least one UE in the distributed V2X environment.

12. The apparatus of claim 9, wherein means for determining the multi-frequency transmission schedule further comprises selecting a subchannel of a transmission frequency based on one or more propagation characteristics of the transmission frequency, the characteristics comprising a range and a transmission quality of the subchannel of the transmission frequency and wherein determining the multi-frequency transmission schedule further comprises selecting the subchannel of the transmission frequency that meets at least one range requirement for a upper layer message.

13. The apparatus of claim 9, wherein means for determining the multi-frequency transmission schedule further comprises selecting a subchannels appropriate for a presence of multiple concurrent transmissions and a baseband restriction.

14. The apparatus of claim 9, wherein means for determining the multi-frequency transmission schedule further comprise selecting a subchannel of a transmission frequency based on at least one of a traffic condition on the transmission frequency, a priority of the transport block of data and a priority of the subchannel of the transmission frequency by other UEs.

15. The apparatus of claim 9, wherein means for determining the multi-frequency transmission schedule further comprises selecting a subchannel of a transmission frequency based on whether the transport block of data is to be replicated on more than one subchannel.

16. The apparatus of claim 9, wherein means for transmitting the multi-frequency transmission schedule further comprises broadcasting the multi-frequency transmission schedule to at least one other UE in the distributed V2X environment.

17. An apparatus for wireless communication at a user equipment (UE), comprising:
 a transceiver;
 a memory; and
 at least one processor coupled to at least one of the memory and configured to:
  determine a number of users on each of one or more subchannels based in part on one or more of: a received demodulation reference signal, a received power during a predetermined time period, and a number of packets successfully decoded;
  determine by the UE a multi-frequency transmission schedule based at least in part on the determined number of users on the subchannel, wherein determining the multi-frequency transmission schedule comprises assigning the one or more subchannels of multiple transmission frequencies of different wireless technologies to the UE in such a way that results in a reduced number of fragmentations of a transport block of data for communications with at least one other UE in a distributed vehicle-to-everything (V2X) environment; and the transceiver configured to:
   transmit by the UE the multi-frequency transmission schedule to the at least one other UE; and
   transmit by the UE the transport block of data based on the multi-frequency transmission schedule.

18. The apparatus of claim 17, wherein the at least one processor is further configured to perform at least one of:
 monitoring traffic of the at least one other UE in the V2X environment;
 updating the multi-frequency transmission schedule based at least in part on an event or a timer; and
 transmitting the updated multi-frequency transmission schedule to the at least one UE in the distributed V2X environment.

19. The apparatus of claim 17, wherein the at least one processor is further configured to determine the multi-frequency transmission schedule by:
 selecting the subchannel of the transmission frequency that meets at least one range requirement for an upper layer message.

20. The apparatus of claim 17, wherein the at least one processor is further configured to determine the multi-frequency transmission schedule by one or more of:
 selecting a subchannels appropriate for a presence of multiple concurrent transmissions and a baseband restriction,
 estimating a number of UEs listening on a subchannel of a transmission frequency and selecting the subchannel of the transmission frequency based on how densely the subchannel of the transmission frequency is populated with UEs in a distributed V2X environment, and
 selecting a subchannel of a transmission frequency based in part on a traffic condition on the subchannel of the transmission frequency, a priority of the transport block of data, and a priority of the subchannel of the transmission frequency by other UEs.

21. A method of wireless communication at a user equipment (UE) in a distributed vehicle to everything (V2X) environment, comprising:
 receiving a multi-frequency transmission schedule directly from another UE in the distributed V2X environment, wherein the multi-frequency transmission schedule comprises at least one assignment of a subchannel of a transmission frequency of multiple transmission frequencies of different wireless technologies in such a way that results in a reduced number of fragmentations of a transport block of data, wherein the multi-frequency transmission schedule is determined based in part on a number of users on each of one or more subchannels and wherein the number of users is determined based in part on one or more of: a received demodulation reference signal, a received power during a predetermined time period, and a number of packets successfully decoded; and
 receiving the transport block of data based on the received multi-frequency transmission schedule.

22. The method of claim 21, wherein the multi-frequency transmission schedule is a semi-persistent schedule or an event-driven schedule and is received in a broadcast message.

23. The method of claim 21, further comprising at least one of:
 monitoring traffic of at least one other UE in the distributed V2X environment;
 receiving an updated multi-frequency transmission schedule in a broadcast message; and
 determining a second multi-frequency transmission schedule of the UE based on the received multi-frequency transmission schedule of the another UE and the monitored traffic of the at least one other UE in the distributed V2X environment.

24. The method of claim 21, wherein receiving the transport block of data comprises receiving the transport block of data on more than one transmission frequency based on the received multi-frequency transmission schedule.

25. The method of claim 21, wherein receiving the transport block of data comprises receiving a data flow on more than one subchannels of one or more transmission frequencies based on the received multi-frequency transmission schedule.

* * * * *